US009038051B1

(12) United States Patent
Zweifel et al.

(10) Patent No.: US 9,038,051 B1
(45) Date of Patent: May 19, 2015

(54) SELECTING PATCH SOLUTIONS BASED ON AVAILABILITY OF INFORMATION REGARDING PATCHES PREVIOUSLY INSTALLED ON USER SYSTEM

(75) Inventors: Evan R. Zweifel, Ft. Collins, CO (US); Keith R. Buck, Ft. Collins, CO (US); Robert E. Campbell, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2667 days.

(21) Appl. No.: 11/590,077

(22) Filed: Oct. 31, 2006

(51) Int. Cl.
*G06F 9/44* (2006.01)
*G06F 9/445* (2006.01)

(52) U.S. Cl.
CPC .................................. *G06F 8/65* (2013.01)

(58) Field of Classification Search
None
See application file for complete search history.

(56) References Cited

U.S. PATENT DOCUMENTS

| 6,477,703 | B1 | 11/2002 | Smith et al. | |
| 6,954,928 | B2 | 10/2005 | Allsop et al. | |
| 7,020,875 | B2* | 3/2006 | Zweifel et al. | 717/168 |
| 2006/0064685 | A1* | 3/2006 | DeFolo | 717/169 |

OTHER PUBLICATIONS

Merriam-Websters Dictionary, "Available", 2012, Merriam-Websters Incorporated.*

* cited by examiner

*Primary Examiner* — Lewis A Bullock, Jr.
*Assistant Examiner* — Mark Gooray
(74) *Attorney, Agent, or Firm* — Clifton L. Anderson

(57) ABSTRACT

The present invention provides patch solutions for computer programs. A vendor system determines whether information regarding patches previously installed on the system is available. If the information is not available, the system delivers a completely pre-computed solution to the user computer system including a main patch set and its dependencies. If the information is available, the vendor system delivers a partially pre-computed solution including a main patch set and its dependencies except for any of said patches that have successors already installed on said system.

10 Claims, 2 Drawing Sheets

SELECTING PATCH SOLUTIONS BASED ON AVAILABILITY OF INFORMATION REGARDING PATCHES PREVIOUSLY INSTALLED ON USER SYSTEM

BACKGROUND OF THE INVENTION

Herein, related art may be discussed to put the invention in context. Related art labeled "prior art" is admitted prior art; related art not labeled "prior art" is not admitted prior art.

Regardless of the amount of pre-release testing, computer software is rarely flawless when it is released. Security issues, compatibility issues, and other problems may be discovered post release. Accordingly, software developers can release patches to update the software. In the case of some operating systems, hundreds or thousands of patches may be available, so that users often rely on the operating system developer for recommendations regarding which patches to install.

Making such recommendations can be complicated because users have different requirements. Some users may require the latest version for all patches, others may require the amount of patching to be minimized, and others may require something in between. Some users may inform the vendor of the patches currently residing on a system, while other users may prefer to keep such information secret. Some users may require that all their computers have the same or very similar sets of patches installed, while others may prefer tailoring patches to each computer. The present invention addresses the problem of tailoring patch solutions to user requirements. This and other features of the invention are apparent from the description below with reference to the following figures.

BRIEF DESCRIPTION OF THE DRAWINGS

The following figures depict embodiments of the invention, and do not represent the full scope of the invention.

DETAILED DESCRIPTION

Figure 1:
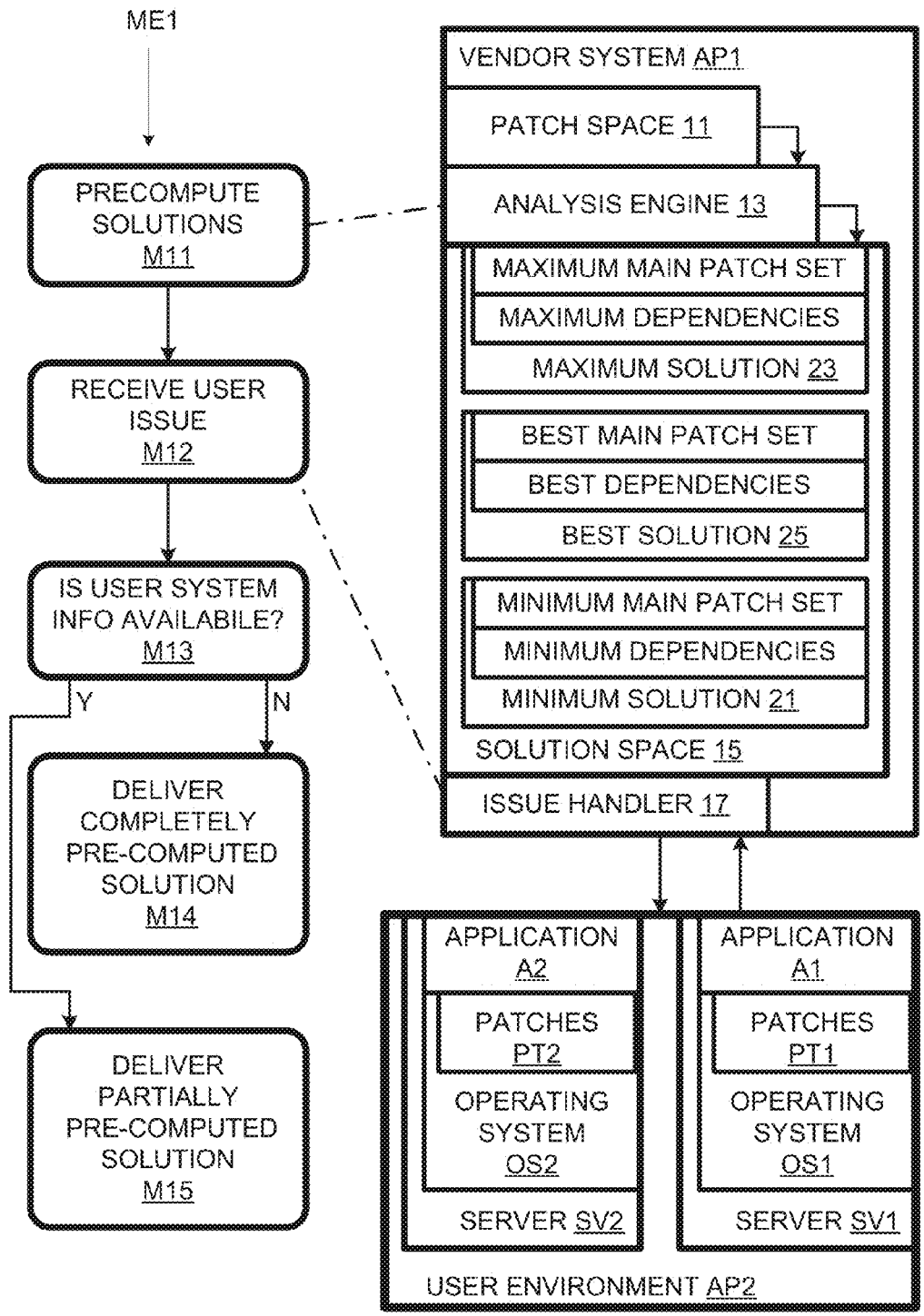
FIG. 1 is a combination schematic illustration and flow chart showing a vendor system, a user computer environment, and a method by which the vendor system provides patch solutions to the user environment.

The present invention provides some new patch solutions and a new method of selecting among patch solutions to accommodate the requirements of a wide variety of users. In accordance with one embodiment of the invention, a vendor system AP1 provides patch solutions to a user computer environment AP2. User environment AP2 has plural servers including servers SV1 and SV2. Server SV1 is running an application A1 on an operating system OS1. Server SV2 is running an application A2 on a second operating system OS2. While applications A1 and A2 are from different vendors, operating systems OS1 and OS2 are two instances of an operating system serviced by the owner of vendor system AP1. Vendor system has previously supplied a first patch set PT1 for operating system OS1 and a second patch set PT2 for operating system OS2.

More generally, the user environment can include one or more servers. The servers can be partitioned or not. One or more applications, whether from the patch vendor, another vendor, or multiple vendors can be running on each partition or server. Patches may be applied to applications and well as operating systems. Initially, the application or operating system to be patched may have been patched previously or not.

Vendor system AP1 includes a patch space 11, a patch analysis engine 13, a solution space 15, and an issue handler 17. Issue handler 17 responds to user needs, e.g., responds to user requests or follows a pre-determined maintenance routine by providing patch solutions to user system AP2. Analysis engine 113 can compute solutions in whole or in part in response to a command from issue handler 17. However, the present invention also provides for pre-computing solutions for issues in anticipation of such commands rather than recomputing solutions for each server and for each user. (Note that pre-computing solutions is addressed by a related and contemporaneously filed patent application entitled "Pre-Computing Computer Software Patch Solutions" by Keith R. Buck, Robert E. Campbell, Evan R. Zweifel, and Robert William Fritz, U.S. patent application Ser. No. 11/590,165.)

Solution space 15 includes a minimum solution 21, a maximum solution 23, and a best solution 25. A "solution" is a set of patches. Typically, a solution will include one or more main patches constituting a "main patch set" that address a user issue (including sub-issues), such as program defects and security issues and problems with compatibility with certain hardware or other software. Typically, some of the main patches with require other patches to be installed—these patches are referred to herein as "dependencies". Computing a solution involving several main patches and their dependencies can be time consuming. Pre-computing solutions allows issue handler 17 to respond more quickly to user requests and avoids having to recompute solutions for each server and for each user.

Most types of solutions require knowledge of the user system configuration in order to compute a solution. However, some users are averse to providing such information to others. The present invention provides solutions that are not dependent on this knowledge. However, the present invention can use such knowledge to adapt a pre-computed solution to a particular server configuration. In particular, "minimum", "maximum", and "best" solutions described below can be pre-computed.

Accordingly, the present invention provides a method ME1 in accordance with an embodiment of the invention; method ME1 is flow-charted in FIG. 1. At method segment M11, solutions are pre-computed. At method, segment M12, a user issue is received. At method segment M13 a determination is made whether or not user system configuration information is available. If system information is not available, a completely pre-computed solution is delivered at M14. If such information is available, a partially pre-computed solution is delivered at M15. For example, a partially pre-computed solution can be computed from a completely pre-computed solution by replacing or omitting some patches that are already installed or have successor already installed on the user system.

Figure 2:
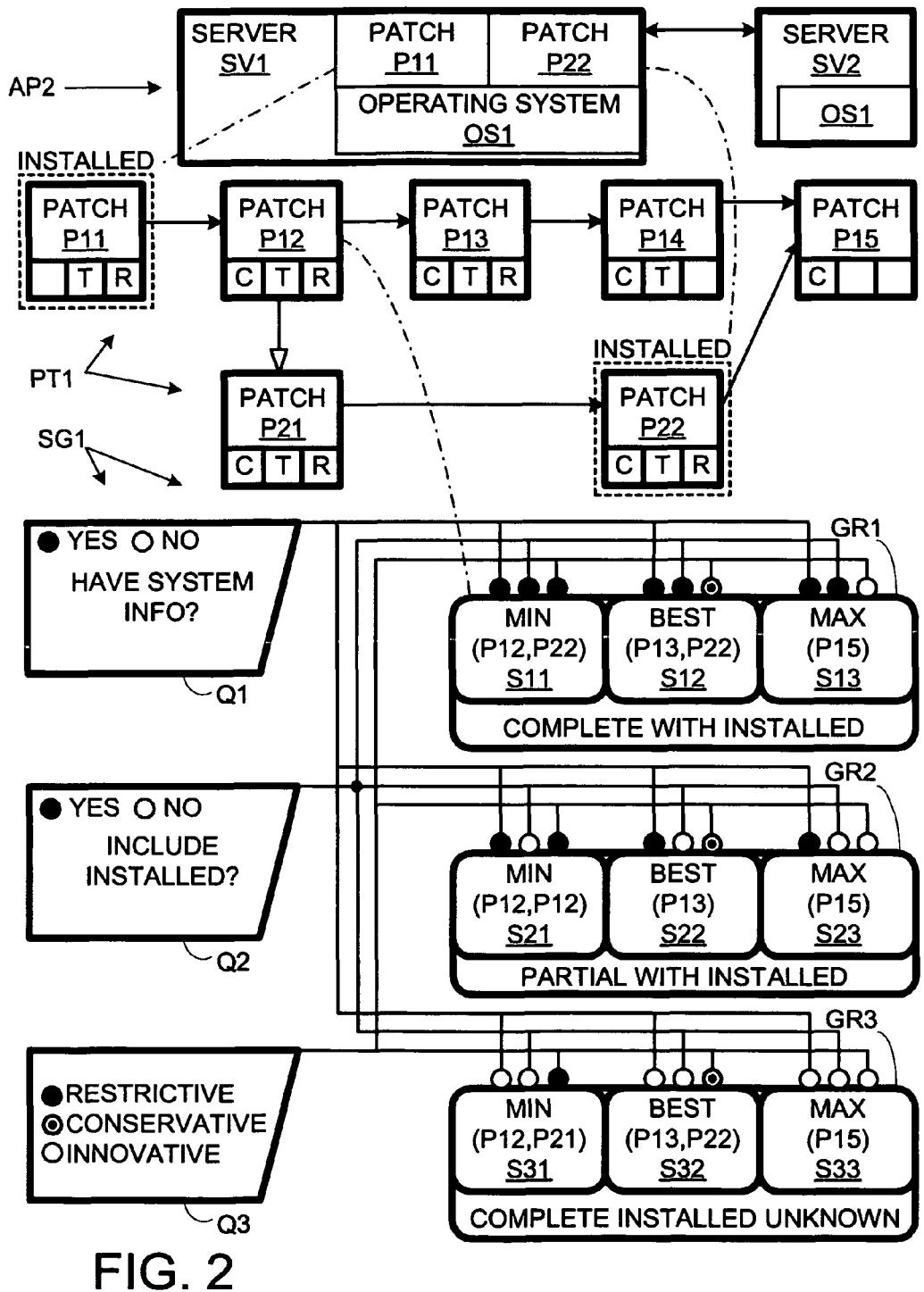
FIG. 2 is a schematic diagram of a user environment, a patch tree, and a query method for selecting a solution.

This method ME1 is explained further below with reference a hypothetical depicted in FIG. 2. As mentioned above, servers SV1 and SV2 are running respective instances of the same operating system. Patches P11 and P22 to operating system have been installed on server SV1, but not on server SV2.

An occasion to update the operating systems on servers SV1 and SV2 can arise because the user has encountered a problem, e.g., a compatibility issue. In other cases, a security issue may arise or a maintenance window has opened. In the hypothetical, patch P11 addressed some problems but not every known problem. Rather, as indicated in patch tree PT1, a progression of successors, e.g., P12-P15 provides increasingly more solutions to the set of known problems. However, patches P12-P14 require (have a dependency upon) patch P21; this dependency can also be met by patch P22. The most-recent patch P15 merges the main patch progression P11-P14 and dependency progression P21-P22, so that patch P15 is not dependent on another patch.

Even with this simple patch tree, there are fifteen possible patch combinations: five choices from P11-P15 and three from P21, P22, and no dependent patch. In cases with hundreds of patches with multiple dependencies, the number of possible patch solutions (a set of patches to be stored and installed on a server) can be unwieldy. To limit the choices available, the user and situation can be categorized using questions Q1-Q3.

The first question Q1 is whether the developer or entity recommending a patch solution knows what patches are installed on a subject server. Obviously, it is easier to optimize a solution where the pre-existing state is known. However, some users may see a security risk in informing others of the exact configuration of its servers. Accordingly, the recommended patch solution may depend on whether or not the existing patch configuration is known by the solution provider.

If the existing patch configuration is known (answer to Q1 is "yes"), the second question Q2 arises: should the solution include patches that are already installed? For example, should a patch solution including patch P11 or P12 be applied to server SV1? At first consideration, "no" would seem to be the more likely answer. A user would not want to use the additional bandwidth and storage space required for patches already installed on a system. On the other hand, reinstalling a patch as part of a solution may effectively repair the older instance. Also, a solution that includes patches already installed on one server can also be applied to other servers to increase the uniformity of the patch configuration across servers. This can simplify network administration.

The third question relates to whether the user is "restrictive", "conservative", or "innovative". A "restrictive" user makes the minimum changes that are required, e.g., to keep a server running or secure. An "innovative" user desires the latest version of patches, e.g., under the assumption that later successor patches address weaknesses in their predecessors. A "conservative" user also wants recent patches, as long as some quality constraint is met—e.g., the patches have proved reliable after substantial "in-the-field" testing. While this question nominally categorizes the user, it can be situational—as a user may be "restrictive" as to mission critical servers, and "innovative" regarding test and development servers.

A solution grid SG1 maps answers to questions Q1-Q3 to proposed solution types. S11-S33, which are arranged in three groups GR1-GR3, as shown in FIG. 2. Group GR1 includes "complete with installed" solutions S11-S13; group GR2 includes "partial with installed" solutions S21-S23; and group GR3 includes "complete installed unknown" solutions S31-S33. Within each group GR1-GR3, there are "minimum", "best", and "maximum" solutions corresponding to the user categorization as "restrictive", "conservative", and "innovative". Note, the minimum and maximum solutions are unique, while the best solutions depend on user-defined criteria for "best".

A user can define "best" in terms of patch attributes. In the patch tree of FIG. 2, each patch can include flags indicating the presence of one or more predefined attributes: "C" means "critical", "T" means "field tested", and "R" means "reliable" (according to field testing). In this case, one user might define "best" as "most-recent reliable patch", while another might define "best" as "not unreliable" (either not tested or tested and found reliable).

The minimum, maximum, and best solutions can be completely pre-computed, i.e., they can be determined from the issue involved without knowing the configuration of the target computer hardware/software system. The minimum-with-installed and the best-with-installed solutions are partially computed in the sense that they are determined by modifying respectively the minimum and best solutions based on the patches already installed on the target system.

Other embodiments can use more complex criteria for defining best. For example, the patch attributes can be as follows. "Security" is a Boolean flag indicating that the flagged patch addresses a security issue. "Critical" is a Boolean flag indicating that the flagged patch contains a fix to a critical significant defect. "Warning" is a Boolean flag indicating that the flagged patch introduces unexpected behavior and should be avoided. "Quality Rating" is a number between 1 and 3 that indicates how much testing has been performed on this patch. A higher rating indicates a more reliable patch. "Availability" is an attribute that may take on the values: "All", "Limited", and "None". A patch that has an availability value of "All" may be accessed (downloaded) by all parties. A patch that has an availability value of "Limited" may be accessed (downloaded) only by specially empowered users. A patch that has an availability value of "None" cannot be accessed.

"Minimum patches" are the earliest patches on a chain with a particular attribute. Minimum patches are useful during patch analysis where the patch analysis application is trying to identify which issues are exposed on a system. For example, if patch P12 addresses a security issue (and therefore the security flag is 'true') that patch P11 does not, then patch P12 is the minimum patch. The analysis tool will recommend that the user install patch P12 or one of its successors (as well as any necessary dependent patches) otherwise the system will be vulnerable to the security threat addressed by patch P12. The patch selected is referred to as the "recommendation patch". The patch together with its dependency patches is the "recommended solution".

Patch analysis involves: 1) the identification of all of the minimum patches with a particular attribute which are not installed on a system, followed by 2) a determination of a set of patches which contains the missing minimum patches (or one of their successors) as well as all necessary dependents. The present invention addresses this second step. Historically (at least for HP-UX, available from Hewlett-Packard Company) the determination of a solution set of recommendation patches and dependencies has been configurable based on the risk adverseness of the user. A user, who is identified as conservative, will receive (whenever possible) the last highest-rated patch on the chain with rating of at least 2 as the recommendation patch, as well as all dependencies for that patch using the same rule. A user, who is identified as innovative, will receive the latest version of the patch on the chain when computing recommendations and dependencies.

The present invention provides for several new patch solutions (recommendation patches and dependencies) based on situation. Each of the versions listed below is well defined and appropriate for a particular patching configuration. In general, the situations differ based on whether the patches will be identified and applied in a reactionary situation (to address a problem which has been identified), or during a regularly scheduled maintenance window. Furthermore, patch selection can be influenced by the desire to identify a solution that is applicable/reusable for several similar machines within the environment.

The "minimum solution" is defined to contain the minimum (earliest) patch that fixes a problem, as well as all of the minimum (earliest) dependencies of that patch. The minimum solution is good for reactive patching, when trying to address an issue on a system without unnecessarily including changes introduced in subsequent versions of the patches. The solution may contain patches that will not install on the system (because a successor patch is already installed)—and assumes that the system's patch installation program can recognize and handle this situation. The minimum solution may contain patches that will install, but are not needed. This can happen when a dependent patch, A, specifies a dependency, B, but the successor to the patch A, which is already installed, does not have the dependency. This solution can be applied to many machines within the environment without having to analyze them individually however, after applying the solution the resulting systems may not be identically configured. Also, this solution has the desirable property that it can be determined independently of the system being analyzed—and therefore be pre-computed.

The "complete-minimum-with-installed solution": is defined to contain the minimum (earliest) patch that fixes a problem. All of the minimum (earliest) dependencies of that patch are included unless a successor to the dependency is already installed, in which case the successor is included. Again, the complete minimum with installed solution is good for reactive patching. Additionally, the solution will contain only patches that will install or are already installed. The solution will not contain patches that will install unnecessarily. Applying the solution to other systems within the environment is possible and will result in systems which are closely configured (with regards to the patch chains involved in this solution), differing only when unanalyzed systems have successor patches already installed.

The "partial-minimum-with-installed" solution is defined to contain the minimum (earliest) patch that fixes a problem. All the minimum (earliest) dependencies of that patch are included unless a successor to the specified dependency is already installed, in which case the dependency is not included. Again, the partial-minimum-with-installed solution is good for reactive patching. Additionally, the solution will contain mostly patches that will install (except for factors outside the scope of the analysis). However, applying the solution to other systems within the environment is not recommended (and may not be possible) because necessary dependencies may not be met. Because the solution contains mostly patches that will install, the solution will be relatively small and therefore be easier to deliver electronically than the other minimum solutions.

The "maximum solution" is defined to contain the maximum (most recent) patch that fixes a problem, as well as all of the maximum (most recent) dependencies of that patch. The maximum solution is particularly risky—primarily because recent patches may not have been in the field for very long, and as a result may contain defects that have not yet been found. However, some customers prefer to use the latest versions of patches so that all available defect fixes are made whenever they apply the patches. The solution may contain patches that will not install on the system (because a patch is already installed). Applying the solution to other systems within the environment is possible and will result in systems that are identically configured (with regards to the patch chains involved in this solution). Also, this solution has the desirable property that it can be determined independently of the system being analyzed—therefore be pre-computed.

The "complete-maximum-with-installed solution" is defined to contain the maximum (most recent) patch that fixes a problem. All of the maximum (most recent) dependencies of that patch are included unless a successor to the specified dependency is already installed, in which case the installed successor is included. Again, the complete-maximum-with-installed solution is risky since it includes recent patches. However, it only contains patches on the minimum set of necessary patch chains. Additionally, the solution will contain mostly patches that will install or are already installed. The solution will not contain patches that will install unnecessarily. Applying the solution to other systems within the environment is possible and will result in systems which are closely configured (with regards to the patch chains involved in this solution), differing only when unanalyzed systems have successor patches already installed on patch chains which do not have the latest version installed on the analyzed system.

The "partial-maximum-with-installed solution" is defined to contain the maximum (most recent) patch that fixes a problem. All of the maximum (most recent) dependencies of that patch are included unless a successor to the specified dependency is already installed, in which case the dependency is not included. Again, the partial maximum with installed solution is risky—because it includes recent patches. However, the solution will contain only patches that will install. Also, applying the solution to other systems within the environment is not recommended (and may not be possible) because necessary dependencies may not be met. Because the solution contains only patches that will install, the solution will be relatively small and therefore may be easier to deliver electronically than the other maximum solutions.

The "best solution" is defined to contain the best successor to the desired minimum patch, as well as the best versions of all of the dependent patches. "Best" is defined to be some weighted function of the attributes of the patch (quality rating, warnings, availability, etc.). The definition of this function changes and is considered a business policy and is currently designed to prefer the last highest quality rated, available patch, without a warning, with a quality rating of at least 2, on the chain. Like the minimum solution, this solution can be determined independently of the system being analyzed and therefore be pre-computed. It is appropriate for proactive situations where, during a maintenance window, the recommended versions of patches are installed to bring the system up to date using a reliable set of patches. This best solution can be applied to many systems within the environment. Again the best solution may contain patches that will not install, as well as patches that will install but are not needed.

The "best-with-installed solution" is defined to contain the best successor to the minimum patch. All the best versions of the dependencies of that patch are included unless a successor to the dependency is already installed, in which case the successor is included. Like the best solution, this solution is appropriate for proactive situations. However, because it considers installed patches during dependency analysis, the solution will not contain unnecessary patches or patches that will not install. Like the minimum-with-installed solution, applying the solution to other systems within the environment is possible and will result in systems which are closely configured (with regards to the patch chains involved in this solution), differing only when unanalyzed systems have successor patches already installed.

The "partial-best-with-installed solution" is defined to contain the best patch that fixes a problem. All of the best dependencies of that patch are included unless a successor to the specified dependency is already installed, in which case the dependency is not included. Again, the partial-best-with-installed solution is good for reactive patching Additionally, the solution will contain mostly patches that will install. However, applying the solution to other systems within the environment is not recommended (and may not be possible) because necessary dependencies may not be met. Because the solution contains only patches that will install, the solution will be relatively small and therefore be easier to deliver electronically than the other best solutions.

Solutions in reactive situations use either the best solution or the partial-best-with-installed-solution—depending on whether or not a list of installed software is provided to the tool. In proactive solutions, the available tools use either partial-best-with-installed or partial-latest-with-installed—depending on the specification of risk adverseness of the user. In this case a list of installed software must be provided to the tool. By extending the current patch analysis toolset to include the ability to specify the desired solution (minimum, complete-minimum-with installed, partial-minimum-with-installed, best, complete-best-with installed, partial-best-with-installed), the resulting output is more appropriate for a variety of patching scenarios.

The available solutions can be presented as a menu, allowing the user to select which solution to generate. Alternatively (and perhaps more appropriately) a system of questions can be asked to determine which scenario the user is in and then select the appropriate solution. For example:

Question 1: Can you provide system inventory information? Is a list of installed software (including patches) available to assist the analysis tool?

Question 2A: "Do you want the system to include patches that are already installed on the system?" Answering "no" may result in an incomplete solution which is only appropriate to the system being analyzed, on the other hand, the solution may be smaller and easier to deliver to this user.

Question 2B: "Will you use the generated solution on systems other than the system being analyzed?"

Question 3A: "Is your patch strategy 'restrictive' or 'conservative', or 'innovative'?" These terms have been used historically at Hewlett-Packard Company to describe the amount of risk is acceptable to the user. A restrictive user or situation calls for minimizing risk; an innovative user or situation calls for the latest available patches; and a conservative user or situation calls for the best solution.

Question 3B: "Are you patching in reactive situation or proactively?" A reactive solution indicates that a particular problem is being addressed, and that the user has identified the specific patch that fixes the problem. A proactive patcher is attempting to bring his system to a more recent state during a maintenance window.

Note that questions Q2B and Q3B are not represented explicitly in FIG. 1. Question Q2B can be considered a reason a user might answer "yes" to question Q2. If a solution is to be applied to servers other than the one the solution was defined for, then there can be advantages to including copies of previously installed patches.

The solutions for conservative and innovative users do not depend on whether an update is proactive or reactive. Thus, the answer to Question Q3B is only useful in selecting a solution in the case of "restrictive" users. Restrictive users usually patch reactively, so the restrictive-and-proactive case is rare. However, restrictive users sometimes patch proactively and, when they do, a "best" solution (that typically results from a "conservative" strategy) is recommended. However, for completeness, the answers to questions 2B and 3B should be taken into account. A more complete method for selecting a solution is set forth in the following pseudocode.

```
(Begin)
If (Restrictive and Reactive)
{
   If (have system information)
   {
      if ((May use solution on other systems) or (include
         patches that are already installed on the system))
      {
         Use Complete Minimum with Installed Solution
      {
         else (Won't use on other systems and won't include
            already installed patches)
      {
         Use Partial Minimum with Installed Solution
      }
   }
   else {(don't have system info)
      Use Minimum Solution
   }
}
else if (Innovative and either reactive or proactive)
{
   If have system information
   {
      if ((May use solution on other systems) or (include
         patches that are already installed on the system))
      {
         Use Complete Maximum with Installed Solution
      }
      else (won't use on other systems and won't include
         already installed patches)
      {
         Use Partial Maximum with Installed Solution
      }
   {
   else {(don't have system info)
      Use Maximum Solution
   }
}
else {(conservative or (restrictive and proactive))
   If have system information
   {
      if ((May use solution on other systems) or (include
         patches that are already installed on the system))
      {
         Use Complete Best with Installed Solution
      }
      else (won't use on other systems and won't include
         already installed patches)
      {
         Use Partial Best with Installed Solution
      }
   }
   else {
      Use Best Solution
   }
} (END)
```

The illustrated example addresses a single user issue with a single main patch and a single dependency patch. More generally, a user issue can be a set of "sub-issues" that may be related or unrelated to each other. The solution can be a "main" set of "main" patches and a "dependency" set of "dependency" patches on which the main patches depend.

The present invention applies broadly to software and software/hardware systems, whether operating systems, applications, utility programs, etc. are being patched. The patch space can be large or small; the invention scales reasonably with the size of the patch space and the complexity of the dependencies. Various systems for assigning attributes can be employed, and these attributes can be used to allow a variety of definitions for "best" as the term is used in patch solutions. These and other variations upon and modifications to the illustrated embodiments are provided for by the present invention, the scope of which is defined by the following claims.

What is claimed is:

1. A method of providing software patch recommendations for patching a computer system running a program, said method comprising:
    receiving a user issue;
    in response to said receiving, determining whether or not information regarding patches previously installed on said system is available;
    if said information is not available, selecting from plural pre-computed solutions for said user issue and delivering a completely pre-computed solution to said computer system, said completely pre-computed solution including a main patch set and its dependents, said plural pre-computed solutions being computed and recognized as solutions for said user issue prior to said receiving; and
    if said information is available, selecting and delivering an at least partially pre-computed solution including said main patch set and said dependents except for any of said patches that are or have successors already installed on said system.

2. A method as recited in claim 1 wherein said main patch set contains the earliest patches addressing a given issue for said system.

3. A method as recited in claim 2 wherein said dependents are the earliest patches meeting dependency requirements of said main patch set.

4. A method as recited in claim 1 wherein said plural pre-computed solutions are multi-patch solutions and said main patch set contains the latest patches addressing a given issue for said system.

5. A method as recited in claim 4 wherein said dependents are the latest patches meeting dependency requirements of said main patch set.

6. A system of providing software patch recommendations for patching a computer system running a program, said system comprising:
    a processor;
    a solution space including plural pre-computed solutions for a user-issue, and
    a request handler configured to provide a patch solution in response to a user request regarding said user issue, said request being received after said plural pre-computed solutions have been computed and recognized as solutions for said user issue, said request handler being configured to determine whether or not information is available regarding patches previously installed on said user system, said request handler being further configured to
        if said information regarding patches previously installed on said user system is unavailable, selecting from said plural pre-computed solutions and delivering a completely pre-computed solution to said computer system, said completely pre-computed solution including a main patch set and its dependents, and
        if said information is available, selecting and delivering an at least partially pre-computed solution including said main patch set and said dependents except for any of said patches that are or have successors already installed on said system.

7. A system as recited in claim 6 wherein said main patch set contains the earliest patches addressing a given issue for said system.

8. A system as recited in claim 7 wherein said dependents are the earliest patches meeting dependency requirements of said main patch set.

9. A system as recited in claim 6 wherein said plural pre-computed solutions are multi-patch solutions and said main patch set contains the latest patches addressing a given issue for said system.

10. A system as recited in claim 9 wherein said dependents are the latest patches meeting dependency requirements of said main patch set.

* * * * *

UNITED STATES PATENT AND TRADEMARK OFFICE
CERTIFICATE OF CORRECTION

| | | |
|---|---|---|
| PATENT NO. | : 9,038,051 B1 | Page 1 of 1 |
| APPLICATION NO. | : 11/590077 | |
| DATED | : May 19, 2015 | |
| INVENTOR(S) | : Evan R. Zweifel et al. | |

It is certified that error appears in the above-identified patent and that said Letters Patent is hereby corrected as shown below:

In the Claims

In column 10, line 9, in Claim 6, delete "user-issue" and insert -- user issue --, therefor.

Signed and Sealed this
Twentieth Day of October, 2015

Michelle K. Lee
*Director of the United States Patent and Trademark Office*